United States Patent [19]
Wolfe, Sr.

[11] Patent Number: 5,383,689
[45] Date of Patent: Jan. 24, 1995

[54] SEPARABLE CONNECTOR FOR PRESSURE FLUID COMPONENTS

[75] Inventor: John R. Wolfe, Sr., Englewood, Colo.

[73] Assignee: Wilkerson Corporation, Englewood, Colo.

[21] Appl. No.: 89,749

[22] Filed: Jul. 9, 1993

[51] Int. Cl.⁶ .................. F16L 39/02; F16L 37/26
[52] U.S. Cl. .................. 285/137.1; 285/325; 285/364
[58] Field of Search .......... 285/364, 325, 334.1, 285/137.1, 81, 305, 19, 131

[56] References Cited
U.S. PATENT DOCUMENTS

| | | | |
|---|---|---|---|
| 3,934,605 | 1/1976 | Legris | 285/325 X |
| 4,070,045 | 1/1978 | Colter et al. | 285/325 |
| 4,082,324 | 4/1978 | Obrecht | 285/137 |
| 4,289,335 | 9/1981 | Olbermann | 285/91 |
| 4,352,511 | 10/1982 | Ribble et al. | 285/91 |
| 4,533,020 | 8/1985 | Yamazaki | 285/364 X |

FOREIGN PATENT DOCUMENTS 2470912  6/1981  France ................ 285/325

*Primary Examiner*—Dennis L. Taylor
*Assistant Examiner*—Heather Chun Shackelford
*Attorney, Agent, or Firm*—Ralph F. Crandell

[57] ABSTRACT

A modular connector (20) for separably joining two modular pressure fluid components (21, 22) such as filters, regulators, lubricators, dryers, drains, manifolds, unions, and the like. The connector (20) utilizes a modular arrangement of a joining block (24) and mounting slides (25) on each pressure fluid component (21, 22), with tracks or guide rails (44) on the block (24) engagable in grooves (48) on the mounting slides (25) to provide a slide fit between the connector (20) and the components (21, 22) with mating wedge or cam elements providing a tight sealing engagement therebetween. The components can be positioned from either side, left or right-handed, of the connector. Adjoining sealing surfaces (26, 28) on the components and connector are clamped tightly together in sealed relation by the wedge or cam members, and O-ring seals (29) are utilized to provide a fluid tight seal between the sealing surfaces.

3 Claims, 3 Drawing Sheets

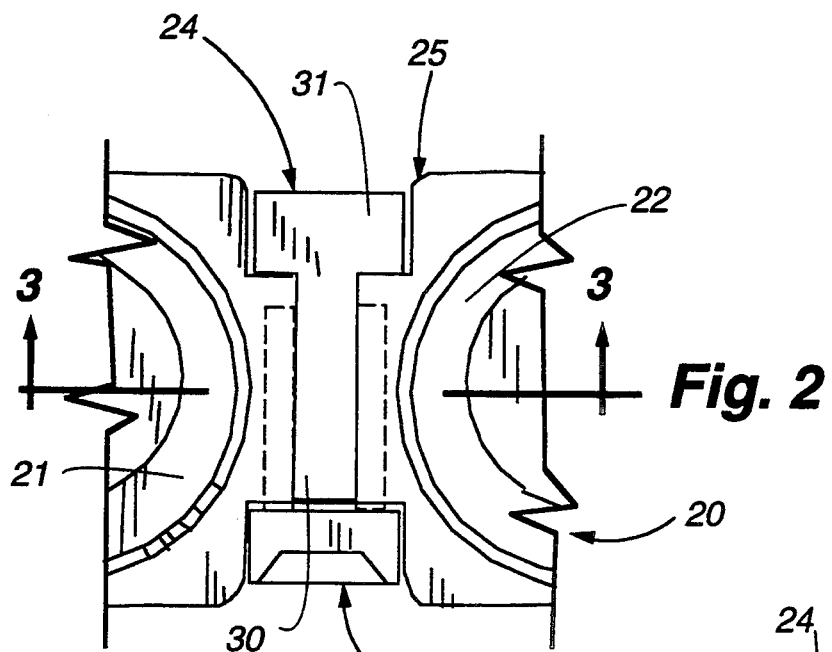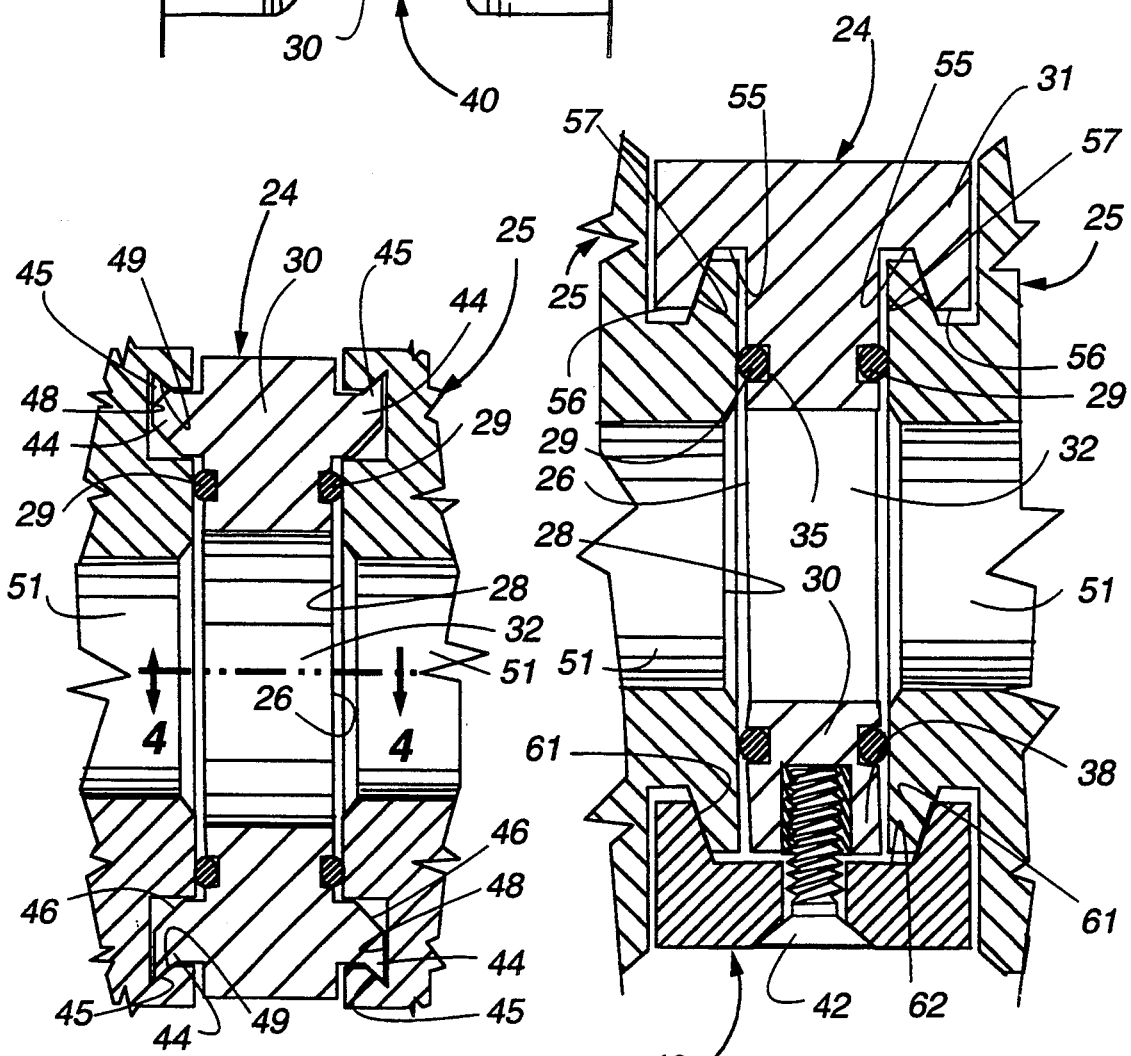

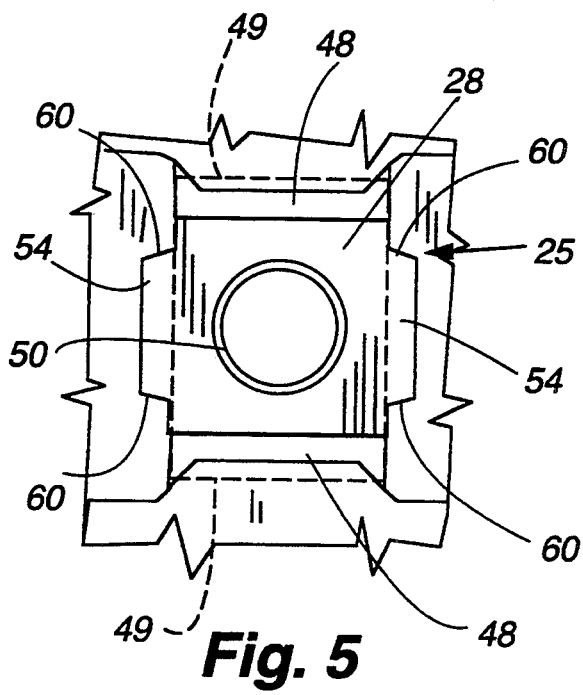
Fig. 5
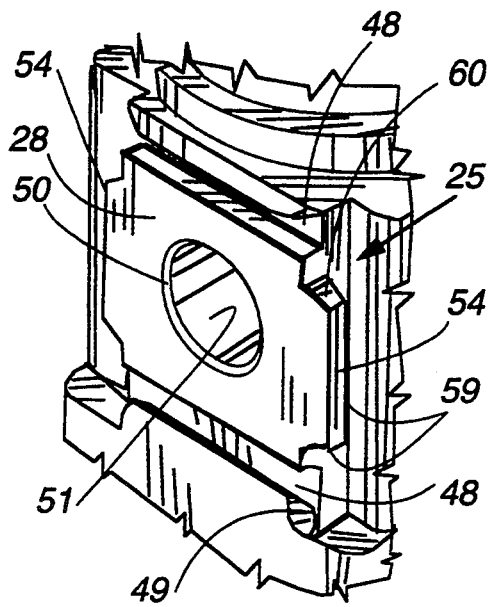
Fig.-6
Fig. 7
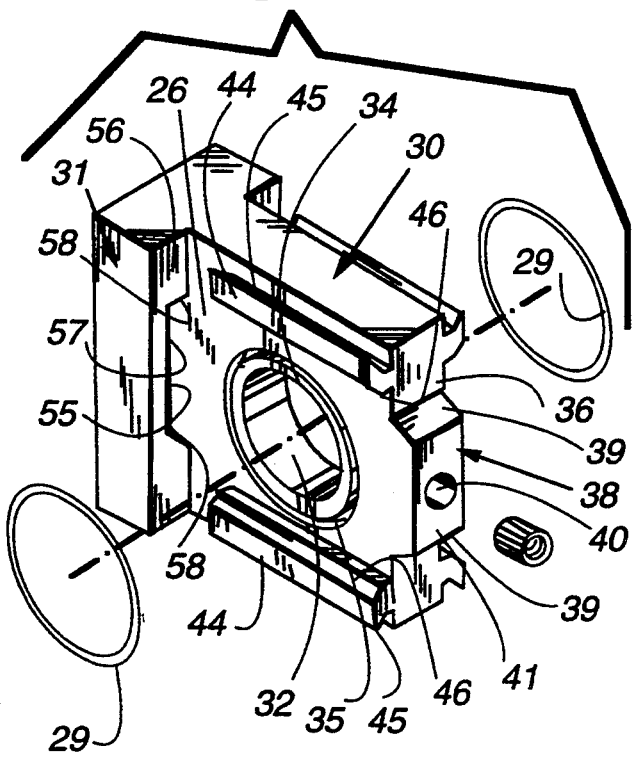
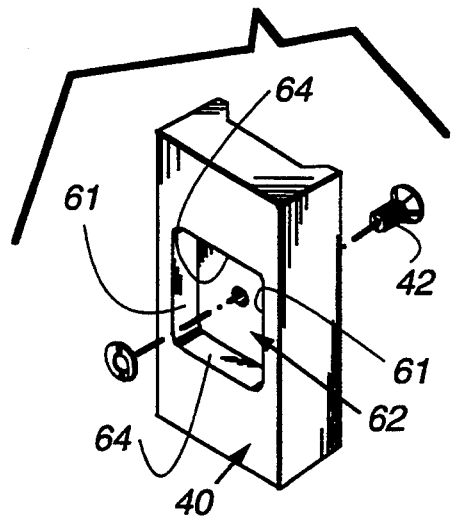
Fig. 8

SEPARABLE CONNECTOR FOR PRESSURE FLUID COMPONENTS

BACKGROUND OF THE INVENTION

1. Field of the Invention

The present invention relates to a separable connector for releasably coupling two pressure fluid components such as filters, regulators, lubricators, dryers, drains, and the like, in fluid tight relation.

2. Description of the Prior Art

Fluid pressure systems, such as compressed air systems, require the use of a variety of interconnected devices such as filters, regulators, lubricators or oilers, drains, dryers and the like. These components have conventionally been connected by means of standard threaded piping arrangements. Various improved separable connectors have been proposed, such as the separable connections described in U.S. Pat. No. 4,070,045, issued Jan. 24, 1978 to J. S. Colter, et al. for "SEPARABLE CONNECTION FOR CONDUIT SEGMENTS CONVEYING A FLUID UNDER PRESSURE"; U.S. Pat. No. 4,082,324, issued Apr. 4, 1978 to R. E. Obrecht for "CONNECTION ARRANGEMENT FOR MANIFOLD BLOCKS"; U.S. Pat. No. 4,289,335, issued Sep. 15, 1981 to J. M. Olbermann for "MODULAR CLAMPING SYSTEM FOR PRESSURE FLUID COMPONENTS"; and U.S. Pat. No. 4,352,511, issued Oct. 5, 1982 to F. Ribble, et al. for "RELEASABLE CLAMP FOR MODULAR CONNECTOR."

OBJECTS OF THE INVENTION

It is the principal object of the present invention to provide an improved separable connector for releasably coupling two pressure fluid components in fluid tight relation.

Another object of the present invention is to provide an improved connector for joining modular components in a pressure fluid system.

A further object of the present invention is to provide a separable connector of the foregoing character which is readily engagable and disengagable with the modular components, and which provides a rigid, tightly secured, fluid tight assembly between the components.

Other objects and advantages of the present invention will become apparent as the following description proceeds taken in conjunction with the accompanying drawings.

SUMMARY OF THE INVENTION

The present invention is embodied in an improved modular connector for separably joining two modular pressure fluid components such as filters, regulators, lubricators, dryers, drains, manifolds, unions, and the like. The improved connector utilizes a modular arrangement embodying a slide fit between the connector and the components with mating wedge or cam elements providing a tight sealing engagement therebetween. By utilizing the present invention, the components can be positioned from either side, left or right-handed, of the connector. Adjoining sealing surfaces on the connector and the respective components are clamped tightly together in sealed relation by the wedge or cam members, and 0-ring seals are utilized to provide a fluid tight seal between the sealing surfaces of the components and the connector. The connector is symmetrical so that the components can be easily and rapidly connected in any order or direction.

The invention is embodied in a joining spacer or connector adapted to be positioned between two pressure fluid transmitting components. The spacer is provided with opposite parallel planer sealing surfaces through which pressure fluid ports open and are surrounded by 0-rings. A connector block on each component further defines a component sealing surface including a pressure fluid port therein. The component surfaces are adapted for juxtaposed sealing engagement with a corresponding sealing surface on the joining spacer. The separable component joining spacer is a plate defining a pressure fluid port therethrough and a pair of opposed sealing surfaces into each of which the port opens. A groove surrounds the port in each of the sealing surfaces and an 0-ring is positioned in each groove to project outwardly from the surface. A pair of tracks project from each surface in spaced apart parallel relation on opposite diametric sides of the port, effectively the upper and lower portions thereof. Each track includes a rib extending therealong from the edge of the track opposite from the port.

A mounting block on the plate extends along one edge thereof normal to the tracks and further extends transversely to and beyond the surfaces of the plate. The mounting block and plate define a T-shaped block configuration. The block defines transverse surfaces adjacent to the plate surfaces on each surface of the block. Elongated recesses are defined opening into the block transverse surface adjacent the plate surfaces. Each of the slots defines an elongated slot surface coplaner with the juxtaposed plate surface and an opposing wedge surface sloping inwardly from the face surface of the block.

For clamping a modular unit to the spacer block, a clamp block is releasably secured to the plate along an edge thereof opposite from the mounting block. The clamp block defines a recess therein having outer elongated walls extending generally parallel to the plane of the plate surface and sloping inwardly towards the planes of the plate surfaces to define opposed wedge surfaces. A clamp screw extends through an aperture defined in the clamp block into threaded engagement with the plate for releasably securing the clamp block to the plate. A nose extends from the connector plate and projects into the recess in the clamp block.

A modular connector body is provided on each component. The connector bodies are identical and are adapted to sealingly engage with the joining spacer. Each body defines a sealing surface for cooperative sealing engagement with the sealing surface on the joining spacer. A pressure fluid port extends from the component through the modular connector body.

A pair of longitudinal slots are defined on the modular body for cooperative engagement with the corresponding tracks on the joining spacer. The component can be readily slid onto and off of the joining spacer by engaging the tracks on the spacer in the slots on the modular component.

A transverse recess or notch is defined on each transverse edge of the modular body for receiving respectively the mounting block and clamp block when the joining spacer plate is engaged with the modular connector body.

Each recess defines a transverse shoulder adjacent the body sealing surface. A wedge lip extends outwardly from each shoulder parallel to the body sealing surface and defines a wedge surface on the side thereof adjacent to the transverse shoulder. The wedge surface is dimensioned to engage the mounting block elongated wedge surfaces and the clamp block recess wedge surfaces when the modular body is engaged with the joining spacer and the clamp plate is mounted and tightened into position. The wedge surfaces force the sealing surfaces on the modular body and the joining spacer respectively into tight sealing engagement squeezing the O-ring between them.

In this manner, there is provided a modular connector utilizing a joining spacer between mounting slides on two modular components for tightly sealing and securing the components together.

DESCRIPTION OF THE DRAWINGS

FIG. 2 is a top plan view of a modular connector embodying the present invention joining two pressure fluid components.

FIG. 3 is a section view taken substantially in the plane of line 3—3 on FIG. 2.

FIG. 4 is a section view taken substantially in the plane of line 4—4 on FIG. 3.

FIG. 5 is a side elevation view of a portion of a pressure fluid component adapted for engagement by a modular connector.

FIG. 6 is a side isometric view of the pressure fluid component portion shown in FIG. 5.

FIG. 7 is an exploded rear isometric view of a modular connector embodying the present invention.

FIG. 8 is an exploded front isometric view of an end cap forming a part of the modular connector embodying the present invention.

DESCRIPTION OF THE PREFERRED EMBODIMENT

Figure 1:
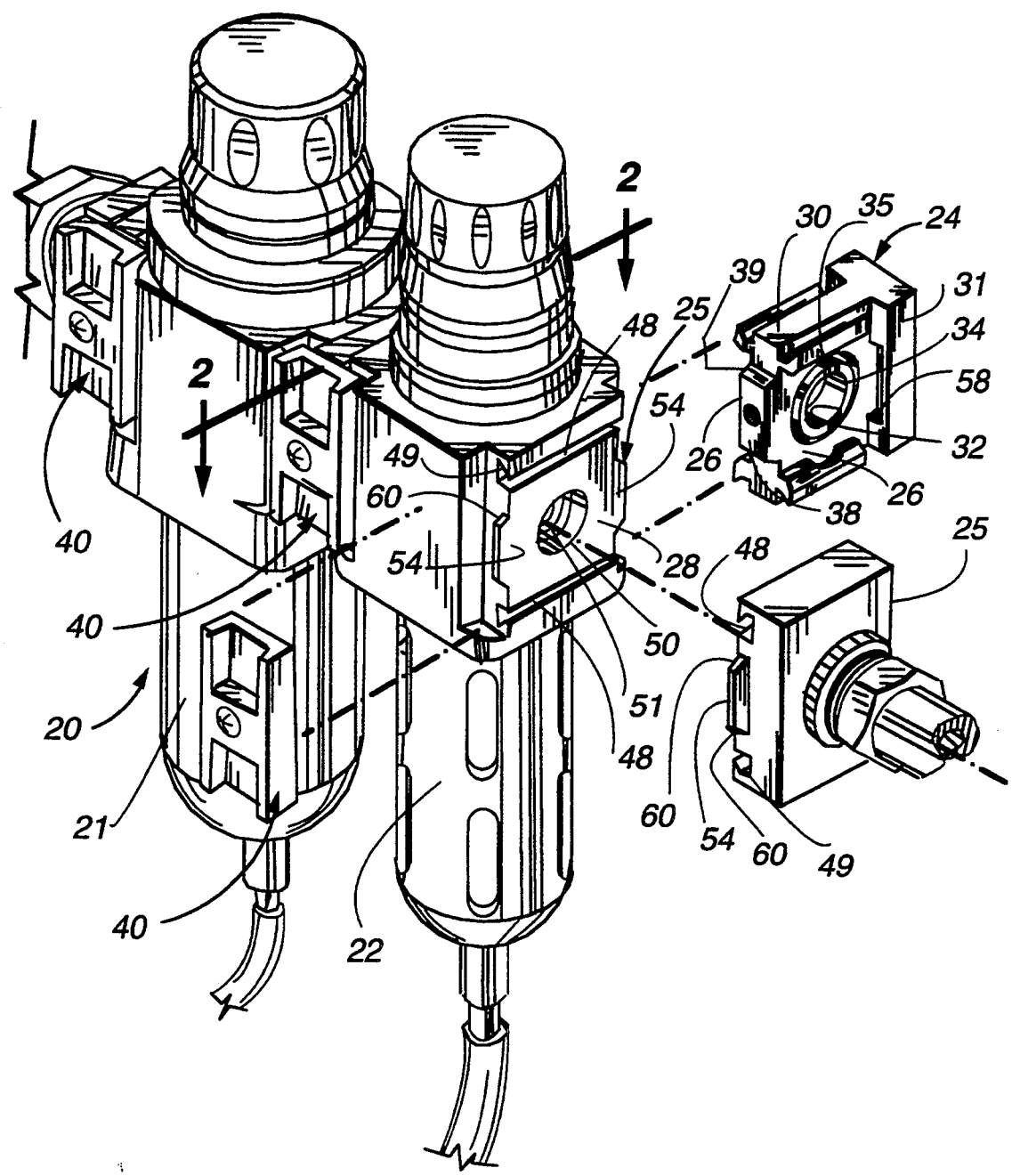
FIG. 1 is a partially exploded isometric view of a modular connector embodying the present invention.

The present invention is embodied in an improved modular connector 20 for separably joining two pressure fluid components 21, 22, such as filters, regulators, lubricators or oilers, dryers, drains, manifolds, unions, and the like. The improved connector 20 is a modular unit incorporating a joining spacer or mounting block 24 and a mating attaching connector or mounting slide 25 on each of the pressure fluid components to be mounted. A slide fit is provided between the mounting block 24 and the mounting slide 25 on each component with wedge or cam elements providing a tight sealing engagement between the adjoining surfaces thereon. By utilizing the present invention, the components can be positioned from either side, left or right-handed, of the pressure fluid components. A sealing surface 26 on the mounting block 24 and a sealing surface 28 on the mounting slide 25 are clamped tightly together in sealed relation by the wedge or cam elements, and O-ring seals 29 between the surfaces are utilized to provide a fluid tight seal between the separable components. The mounting block and mounting slides are symmetrical so that the pressure fluid components can be easily and rapidly connected in any order or direction.

The joining spacer or mounting block 24 is formed by a mounting plate 30, integrally joined at one vertical edge to a support or back plate 31 adapted to be mounted on a fixed surface or support (not shown). The support or back plate 31 extends laterally from the opposing side surfaces of the mounting block in a generally T configuration. The mounting plate defines a central passage 32 therethrough with ports 34 opening into each side sealing surface 26. Each side surface 26 is provided with an annular groove 35 surrounding the port 34 therein for receiving the O-ring seal 29. At its front vertical edge or surface 36 opposite from the support or back plate 31, the mounting plate 30 forms a nose 38 with lateral inclined or wedge surfaces 39 for receiving a mounting end cap 40. A threaded hole 41 is provided in the forward surface of the nose 38 for threadibly receiving a mounting screw 42 extending through the cap for purposes of mounting the cap 40 on the nose 38 and mounting plate 30.

For slidable engagement with the mounting slide 25 on the pressure fluid component to be supported, the mounting plate 30 of the mounting block 24 includes a pair of spaced guide rails 44 on each opposite sealing surface 26 thereof, the guide rails 44 being positioned respectively on diametrically opposite sides of the passage 32 and extending generally perpendicularly toward the support plate 31. Each guide rail 44 is integral with the mounting plate and includes a longitudinal lip 45 extending away from the passage 32 or adjacent port 34. The inner edge 46 of each rail 44 adjacent the passage 32 or port 34 is chamfered to facilitate engagement between the mounting plate 30 on the spacer or mounting block 24 and the mounting slide 25 on the pressure fluid component 21, 22.

The mounting slide 25 on the pressure fluid component is generally of a configuration complimentary to that of the mounting plate 30 and defines a pair of spaced apart grooves 48 adapted to receive the mounting block rails 44. The outer edge of each groove is undercut to provide an inward notch or groove 49 for receiving the lip 45 of each rail 44. The grooves 48 of the mounting slide 25 are positioned on opposite sides of a port 50 of a passage 51 opening into the pressure fluid component so that the slide 50 and passage 51 port coincide with the port 34 and passage 32 in the mounting plate 30 when the connector is assembled. The sealing surface 28 of the mounting slide 25 between the parallel grooves engages with the O-ring seal 29 and the juxtaposed sealing surface 26 of the mounting plate 30 of the mounting block 24 to provide a fluid pressure tight seal between the port 50 of the pressure fluid component and the port 34 of the mounting block 24.

For securing the respective sealing surfaces 26, 28 and the O-ring seal 29 tightly together, cooperative lateral tongue 54 and slot 55 wedge elements are provided respectively on the mounting slide and mounting block. To this end, a wedge groove or slot 55 is provided in the lateral surface 56 of the support or back plate 31 adjacent each sealing surface 26 of the mounting plate 30. The inner surfaces 57 defining each slot 55, that is the surfaces opposed to the mounting plate sealing surfaces 26, are tapered or sloped to provide a wedge. Likewise, the end surfaces 58 of each slot 55 are sloped inwardly to provide opposing wedge surfaces at the defined end of each slot 55 adjacent and at generally a right angle to the lateral wedge surface 56.

For engagement with the wedge slots 55 in the support or back plate 31 of the mounting block 24, the mounting slide 25 is provided with lateral wedge tongues 54 extending outwardly intermediate the rail receiving grooves 48. The tongues 54 are adapted to be inserted into the wedge slots in the support or back plate and are provided with appropriate inner sloping surfaces 59 and end wedge surfaces 60, for cooperative engagement with the complimentary inner sloping surfaces 57 and end surfaces 58 in the mounting plate wedge slots 55. When so inserted as the mounting plate 30 on the mounting block 24 is secured to the mounting slide 25, the wedge tongues 54 engage in the wedge slots 55 and pull the sealing surfaces 26, 28 and 0-ring 29 tightly together.

The mounting of the mounting block and mounting slide is completed by the end cap 40. Side wedge surfaces 61 of a recess 62 defined in the end cap engage the complimentary wedge tongues 54 on the mounting slide of each component 21, 22 when the cap 40 is mounted in place to further pull and secure the respective sealing surfaces tightly together with the 0-rings forming a fluid tight seal therebetween. Likewise, top and bottom wedge surfaces 64 engage the complimentary wedge surfaces 39 on the nose 38.

As the cap 40 is secured to the mounting block by tightening the mounting screw 42 therethrough, the mounting slide and its related pressure fluid component is pulled tightly onto the mounting block with the components in fluid pressure tight sealed relationship.

With the foregoing structure, various pressure fluid components can be mounted in place and readily removed or exchanged. This facilitates changing of the various components to provide for different assemblies of components thereby simplifying the installation procedure and providing for easily adaptable changes and modifications in the pressure fluid components to be utilized.

The mounting block may be secured to a frame or support or may be left unmounted and utilized to secure two fluid pressure components together. For example, a lubricator could be secured to a union with the union in turn secured to a pipe, and with the lubricator further secured to a filter through a mounting block which is mounted on a fixed support.

While an illustrative embodiment of the present invention has been shown in the drawings and described above in detail, it should be understood that there is no intention to limit the invention to the specific form disclosed. On the contrary, the intention is to cover all modifications, alternative constructions, equivalents, and uses falling within the spirit and scope of the invention as expressed in the appended claims.

I claim:

1. A connector for releasably securing together two pressure fluid conducting components in fluid tight sealed relationship, said connector comprising, in combination, a joining spacer defining a pair of opposed sealing surfaces and a pressure fluid port therein opening into each of said surfaces, a connector slide on each component defining a sealing surface and pressure fluid port opening into said surface, said connector slide and said joining spacer being adapted for sealing engagement with corresponding sealing surfaces in juxtaposed sealing relationship and said ports in communication, an O-ring seal positioned between said surfaces and surrounding said ports, a pair of parallel, spaced apart tracks and grooves on said joining spacer and connector slide surfaces, for joining said spacer and slide in sealing relation, and coacting wedge surfaces on said joining spacer and said connector slide for wedgingly clamping said spacer and slide together in sealed relation.

2. A connector for releasably securing together two pressure fluid conducting components in fluid tight sealed relationship comprising in combination a joining spacer adapted to be positioned intermediate two components to be connected, a mounting slide on each component adapted for cooperative sealing engagement each with one side of said joining spacer, a pair of spaced apart tracks on each side of said joining spacer, each said mounting slide defining a pair of spaced apart grooves adapted to receive an inserted pair of said tracks, a pair of oppositely extending wedge tongues on each said mounting slide, a wedge groove defined in said joining spacer for receiving one of said wedge tongues, and a mounting cap for securing said mounting slide and joining spacer together in fluid tight relation, said mounting cap defining a recess having inwardly sloping side walls for wedging engagement with the other of said wedge tongues whereby engagement of said mounting slide and said joining spacer and said cap provides a fluid tight sealed engagement between said slide and said spacer.

3. A connector for releasably securing together two pressure fluid conducting components in fluid tight sealed relationship, said connector comprising, in combination, a joining spacer plate defining a pair of opposed sealing surfaces and a pressure fluid port therethrough opening into each of said surfaces, a mounting slide on each component defining a sealing surface and pressure fluid port opening into said surface, each said mounting slide being adapted for sealing engagement with said joining spacer plate with corresponding sealing surfaces in juxtaposed sealing relationship, an O-ring seal positioned between said surfaces and surrounding said port and passage, a pair of spaced apart tracks on each said joining spacer plate surfaces, said tracks extending in parallel relation on opposite sides of said passage, a pair of spaced apart guide grooves defined on said mounting slide adapted to receive said tracks, a back plate integral with said joining spacer plate and extending along one edge thereof normal to said tracks and extending outwardly transversely to and beyond the surfaces of said spacer plate, said back plate defining transverse surfaces adjacent said plate surfaces, means defining an elongated recess in said back plate on each side of said spacer plate and opening into said transverse surfaces adjacent said plate surfaces, each said slot% defining an elongated slot surface coplaner with said juxtaposed plate surface and a wedge surface sloping inwardly of said slot towards said elongated slot surface, a clamp black releasably secured to said mounting plate along an edge thereof opposite to said back plate, said clamp block defining a recess therein having outer elongated walls extending generally parallel to the plane of said plate surfaces and sloping inwardly towards the plane of said plate surfaces to define opposed wedge surfaces, a clamp screw extending through an aperture defined in said clamp block into threaded engagement with said mounting plate for releasably securing said clamp block to said plate, each said mounting slide defining opposed tongues extending outwardly therefrom intermediate said guide grooves for wedgingly engaging in said slots in said back plate and with said cap surfaces for wedging opposed sealing surfaces together in sealed relation as said cap is tightened on said mounting plate.

* * * * *